United States Patent
Khozikov et al.

(10) Patent No.: US 9,463,879 B2
(45) Date of Patent: Oct. 11, 2016

(54) SYSTEMS AND METHODS FOR PREDICTING AND CONTROLLING ICE FORMATION

(71) Applicant: The Boeing Company, Chicago, IL (US)

(72) Inventors: Vyacheslav Khozikov, Bellevue, WA (US); Robert J. Miller, Fall City, WA (US); Rangasamy Elangovan, Bothell, WA (US); Marc R. Matsen, Seattle, WA (US); Stephen R. Amorosi, Seattle, WA (US); Robert G. Albers, Bellevue, WA (US); Michael Strasik, Sammamish, WA (US); John R. Hull, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 71 days.

(21) Appl. No.: 14/195,091

(22) Filed: Mar. 3, 2014

(65) Prior Publication Data
US 2015/0246730 A1    Sep. 3, 2015

(51) Int. Cl.
*B64D 15/12* (2006.01)
*B64D 15/20* (2006.01)

(52) U.S. Cl.
CPC ............. *B64D 15/12* (2013.01); *B64D 15/20* (2013.01)

(58) Field of Classification Search
CPC ....... B64D 15/12; B64D 15/20; B64D 15/22
See application file for complete search history.

(56) References Cited

U.S. PATENT DOCUMENTS

| 3,316,344 | A | 4/1967 | Kidd et al. | |
|---|---|---|---|---|
| 4,895,322 | A | 1/1990 | Zieve | |
| 7,913,952 | B2 * | 3/2011 | Boschet et al. | 244/134 D |
| 8,777,163 | B2 * | 7/2014 | Safai et al. | 244/134 D |
| 2008/0251642 | A1 * | 10/2008 | Boschet et al. | 244/134 D |
| 2010/0276501 | A1 * | 11/2010 | Yoshimura et al. | 236/101 R |
| 2011/0049300 | A1 * | 3/2011 | Safai et al. | 244/134 D |

FOREIGN PATENT DOCUMENTS

| EP | 100715 A1 | 2/1984 |
|---|---|---|
| EP | 1 911 673 | 4/2008 |

OTHER PUBLICATIONS

Extended European Search Report dated Jul. 3, 2015 from EP Application No. 15157115; 5 pages.

* cited by examiner

*Primary Examiner* — Philip J Bonzell
(74) *Attorney, Agent, or Firm* — Baldauff IP, LLC; Michael J. Baldauff, Jr.

(57) ABSTRACT

A system and method for operating an ice detection and deicing system are provided herein. The ice detection and deicing system may use changing magnetic properties of various components caused by temperature changes to detect conditions conducive to, or indicating, ice formation. The ice detection and deicing system may further use eddy currents induced in one or more layers of the system to increase the temperature of the one or more layers to reduce the amount of ice formation or reduce the probability of ice being formed.

18 Claims, 6 Drawing Sheets

SYSTEMS AND METHODS FOR PREDICTING AND CONTROLLING ICE FORMATION

BACKGROUND

Ice buildup on an aircraft surface can be a major safety hazard. Ice buildup on the wings, engine inlets, and air data probes, as well as other possible surfaces, can change the operational characteristics of an aircraft to a point that the aircraft is unable to safely takeoff or continue operations while in flight. Ice can form on leading edges of the plane, increasing the possibility of a stall condition and increasing drag. Thus, in certain conditions, the formation or possibility of formation of ice on certain surfaces of an aircraft can be a serious safety issue.

Conventional ice detection, removal and prevention techniques can involve the use of chemicals such as heated glycol diluted with water to remove ice and unheated, undiluted glycol for reducing the probability of ice buildup after removal. Conventional techniques may also involve heating elements built within the wing or other leading edge surfaces. The heating elements may be hot air flowing through ducts dispersed within the wing structure. The hot air is designed to warm the surface, causing collected ice to melt or to prevent the formation of ice in the first place.

Another heating element technique may be a wire or wire mesh structure built within the wing surface. A current may be passed through the wire or wire mesh, causing heat buildup. The heat, if sufficient, can melt collected ice or prevent the buildup of ice. Another technique is the use of physical shock to remove ice. For example, a deicing boot can be inflated on a surface of the plane. The inflation causes the ice to crack, thus removing the ice from the plane. In another example, an electric transducer can be activated to cause a momentary physical shock, cracking the ice in a similar way as the deicing boot.

Conventional detection and deicing techniques can have some limitations. For example, solutions that use hot air often require retrofitting or adding to the structure of the aircraft. These solutions can also suffer from low efficiency. In another example, heating techniques using wires or wire meshes can have low reliability caused by their sensitivity to vibrations and movements during the normal operation of the aircraft. These types of heating solutions can also significantly increase the cost of manufacture, as integrating the wires or mesh with the aircraft structure often requires additional manufacturing steps. The use of chemicals may also have limitations as well. The chemicals used to deice aircraft are often not environmentally friendly, requiring the use of chemical containment systems to prevent or reduce the possibility of contaminating the environment when used.

It is with respect to these and other considerations that the disclosure herein is presented.

SUMMARY

It should be appreciated that this Summary is provided to introduce a selection of concepts in a simplified form that are further described below in the Detailed Description. This Summary is not intended to be used to limit the scope of the claimed subject matter.

According to one embodiment disclosed herein, an ice detection and deicing system is provided. The ice detection and deicing system may include a heating susceptor operative to increase temperature in response to an eddy current, a detecting susceptor having a Curie temperature configured to change magnetic properties of the detecting susceptor at a desired temperature, and a coil operative to induce eddy currents in the heating susceptor in response to a change in the magnetic properties of the detecting susceptor as the temperature of the susceptor changes from above the Curie temperature to below the Curie temperature.

According to another embodiment disclosed herein, a method for operating an ice detection and deicing system is provided. The method may include operating an aircraft having one or more susceptors on an aircraft external flight surface, detecting a change in a magnetic property of the one or more susceptors caused by a reduction in temperature of the one or more susceptors below a Curie temperature of the one or more susceptors, calculating a temperature change based on the change in the magnetic property, determining a probability of ice formation on the aircraft external flight surface, inducing eddy currents into the one or more susceptors to generate heat within the one or more susceptors, maintaining the induction of eddy currents until a set point is reached, and removing the induced eddy currents once the set point is reached.

According to yet another embodiment disclosed herein, an aircraft wing leading edge is provided. The aircraft wing leading edge may include an erosion shield operative to reduce erosion, a heating susceptor operative to be responsive to eddy current formation, causing the temperature of the heating susceptor to increase, a detecting susceptor having a Curie temperature used to indicate a change in temperature of the detecting susceptor, a composite structure operative to support one or more components of the ice detection and deicing systems, an insulating layer installed between the detecting susceptor and the composite structure, a coil operative to induce eddy currents in the heating susceptor, an alternating current power supply operative to energize the coil to provide for a magnetic flux to induce eddy currents in the heating susceptor to increase the temperature of the heating susceptor, and a concentrator operative to interact and modify a magnetic flux created by the coil to focus the magnetic flux towards the heating susceptor.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

The embodiments presented herein will become more fully understood from the detailed description and the accompanying drawings, wherein.

The plurality of figures presented in this application illustrates variations and different aspects of the embodiments of the present disclosure. Accordingly, the detailed description on each illustration will describe the differences identified in the corresponding illustration.

DETAILED DESCRIPTION

The following detailed description is directed systems and methods for predicting and controlling ice formation on a surface of an aircraft. In some configurations, the present disclosure utilizes changing magnetic properties to detect temperature conditions conducive to, or resulting from, ice formation on a surface of an aircraft. In other configurations, the present disclosure utilizes inductive heating to increase the temperature of an aircraft surface in response to the detection of ice formation conditions. The increase in temperature by inductive heating can, in some implementations, reduce the amount of ice formed on an aircraft surface, or, in other implementations, increase the temperature of the surface of the aircraft to prevent, or reduce the probability of, ice formation. Referring now to the drawings, aspects of the present disclosure will be presented.

Figure 1:
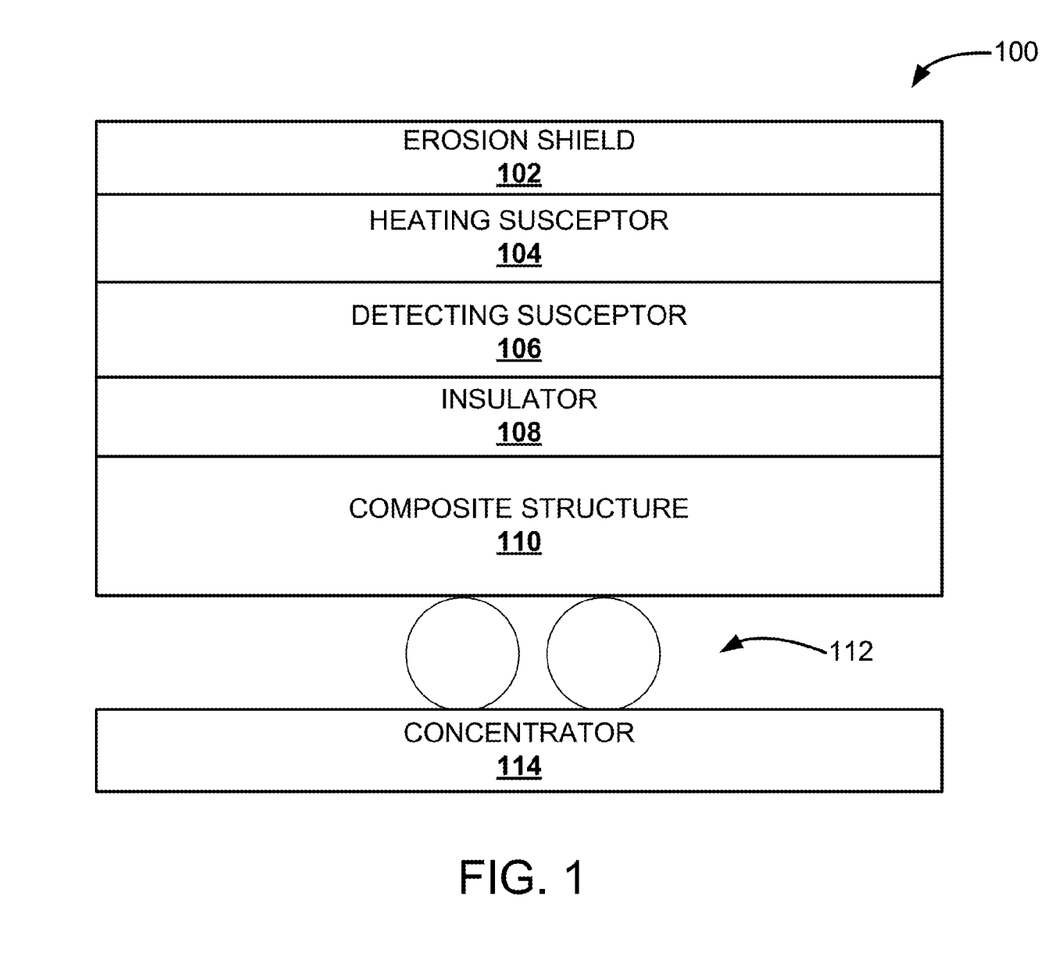
FIG. 1 is a cross-sectional view of an ice detection and deicing ("IDD") system according to at least one embodiment disclosed herein.

FIG. 1 is a cross-sectional view of an ice detection and deicing ("IDD") system 100 according to at least one embodiment disclosed herein. It should be noted that the present disclosure is not limited to systems that perform both ice detection and deicing, as various configurations of the presently disclosed subject matter may be used separately with other systems not specifically disclosed herein. For example, various aspects of the present disclosure may provide for an ice detection system that can be used in conjunction with other deicing systems, including the anti-icing function.

In a similar manner, various aspects of the present disclosure may be provide for a deicing system that may be used in conjunction with other ice condition detection systems not disclosed herein. Further, it should be understood that when referring to "ice detection," the present disclosure is not limited to operations in which ice has formed on a surface of an aircraft. The ice detection aspect may be used in operations to detect conditions that may be favorable to the formation of ice on a surface of an aircraft.

Referring to FIG. 1, the IDD system 100 is a multi-layer system designed, in some configurations, to detect conditions favorable to the formation of ice on an outer surface of an aircraft, or to detect that ice has formed on the outer surface. Further, in some configurations, the IDD system 100 may have the ability to increase the temperature of one or more layers to reduce the likelihood of ice formation, or to at least partially melt ice that has formed, on a surface of an aircraft.

In the configuration illustrated in FIG. 1, the IDD system 100 includes an erosion shield 102. The erosion shield 102 acts as a corrosion-resistant protection layer that is exposed to the environment (or ambient air). For example, the erosion shield 102 may be a relatively hard polymer or plastic designed to withstand physical damage as well as be chemically inert. In some configurations, the erosion shield 102 is constructed from aluminum, steel, titanium, or other corrosion resistant ferrite metals or metallic alloys. The presently disclosed subject matter is not limited to any particular construction material for the erosion shield 102.

Installed proximate to the erosion shield 102 is a heating susceptor 104. As will be described in more detail below, the heating susceptor 104 is constructed in a manner that allows its magnetic properties to be affected by temperature changes. The change in magnetic properties may be a measurable change used to detect conditions that indicate, or are favor to, ice formation. In some configurations, the magnetic properties of the heating susceptor 104 are also configured to cause an increase in the temperature of the heating susceptor 104 when placed within a suitable magnetic field.

Proximate to the heating susceptor 104 is a detecting susceptor 106. As will be described in more detail below, the detecting susceptor 106 is also constructed in a manner that allows the magnetic properties of the detecting susceptor 106 to change based on temperature changes. In some configurations, the magnetic properties of the detecting susceptor 106 are also configured to cause an increase in the temperature of the heating susceptor 104 when placed within a suitable magnetic field.

Proximate to the detecting susceptor 106 is a layer of insulation 108 that may be used as an insulator between the detecting susceptor 106 and a composite structure 110. In some examples, the insulation 108 may be suitable insulating materials such as aerogel, urethane foam, or other thermal insulating materials. In other examples, the insulation 108 may be graphene or a composite formed from graphene. The composite structure 110 may be a multi-layered supporting structure to support various components of the IDD system 100. In some examples, the composite structure 110 is similar to the composite structures used to manufacture other parts of an aircraft. In some configurations, the insulation 108 and the composite structure 110 may not be included in an IDD construction.

Installed proximate to the composite structure 110 is a coil 112. As will be explained in more detail below, the coil 112, which may be one or more coils, may be used to detect changes in magnetic properties of the various layers and/or may be used to induce eddy currents in one or more layers of the IDD system 100 to increase the temperature of the one or more components.

It should be understood that the present disclosure may include more or fewer layers than illustrated in FIG. 1. Further, it should be understood that some of the layers illustrated in FIG. 1 are illustrated separately from other layers for purposes of illustration only and not to limit the scope of the present subject matter to that configurations. For example, the heating susceptor 104 and the detecting susceptor 106 may be integrated into a single layer and may be performed by the same subpart.

As mentioned above, the IDD system 100 of FIG. 1 is configured to utilize changing magnetic properties of either the heating susceptor 104 or the detecting susceptor 106, or both, to measure the effects of temperature to determine if conditions outside of the aircraft are conducive to, or have already formed, ice. In one configuration, the heating susceptor 104 or the detecting susceptor 106, or both, are metals or metallic alloys that have Curie temperatures at desired temperature levels. As used herein, a "Curie temperature" can be defined as the temperature above which ferromagnetic domains disappear. A "ferromagnetic domain" is a microscopic region within which all of the molecular magnetic moments are in the same direction. A "Curie temperature" can also be defined as a temperature at which a material's intrinsic magnetic moments change direction. It should be understood that the presently disclosed subject matter does not depend on a particular definition of the Curie temperature, as definitions may vary depending on various factors, including, but not limited to, a particular field of science or the region in which the term is used.

Transition of a material through the Curie temperature can also affect the resonant frequency of an electrical circuit that the material is a part of, which in some configurations, may provide a difference in output of the circuit when one or more of the metals in the circuit are subjected to their respective Curie temperatures. For example, an alloy of 95 percent nickel and 5 percent chromium may have a Curie temperature of less than 160 F. The alloy's magnetic permeability increases by several orders of magnitude when cooled from 160 F to 32 F, therefore affecting the equivalent impedance seen by the circuit.

This change in magnetic properties of the alloy can be detectable. If so configured, the Curie temperature may be an indicator of temperature conditions that are favorable to, or indicate, ice formation on the erosion shield. For example, the nickel/chromium alloy described above may be adjusted percentage wise, or other metals added, to move the Curie temperature up or down as desired. Thus, the metal's or metallic alloy's Curie temperature may be matched with temperatures that are favorable to ice formation.

In some configurations, one or more layers of the IDD system 100 may perform the ice detection function. In FIG. 1, in one example, the detecting susceptor 106 may be a metal or metallic alloy constructed in a manner to provide for a Curie temperature that, when detected, indicates conditions conducive to ice formation. Cold air outside of the erosion shield 102 may reduce the temperature of the IDD system 100 so that through heat transfer, the temperature of the detecting susceptor 106 is reduced to the point that the detecting susceptor 106 passes through the Curie temperature of the detecting susceptor 106. In some configurations, the Curie temperature of the heating susceptor 104 may be greater than the Curie temperature of the detecting susceptor 106. But, it should be understood that the Curie temperatures of the various layers may be adjusted to achieve desired results.

In some configurations, the heating susceptor 104 may be used as a detector in conjunction with, or instead of, the detecting susceptor 106. The heating susceptor 104 or the detecting susceptor 106 may be formed from various ferromagnetic metals or metallic alloys. In other configurations, if the erosion shield 102 is constructed from a ferromagnetic material, e.g. responsive to magnetic fields, the detecting susceptor 106 or the heating susceptor 104 may be omitted, as their functions may be provided by the erosions shield 102 in a manner similar to that described above for the detecting susceptor 106. In still further configurations, if constructed from an appropriate metal or metallic alloy, a single layer may perform the detection function described above and the heating function described below.

Once conditions are detected that are favorable to ice formation, it may be desirable to heat the particular surface of the aircraft in which the IDD system 100 is installed. To create heat, the IDD system 100 utilizes inductive heating. An alternating current is introduced into the coil 112. If a sufficient current level is introduced, the magnetic field of the coil 112 creates a circulating eddy current in the erosion shield 102, the heating susceptor 104, and/or the detecting susceptor 106 if constructed of appropriate metals.

The circulating eddy currents flow against the electrical resistivity of the erosion shield 102, the heating susceptor 104, and/or the detecting susceptor 106. The eddy current and hysteresis effects can cause heat buildup in the particular layer, thus raising the temperature of a particular layer. In some configurations, the concentrator 114 may be installed to reflect, or focus, the magnetic field created by the coil 112 towards the heating susceptor 104, and/or the detecting susceptor 106. The concentrator 114 may also help to insulate other components (not shown) from the magnetic field created by the coil 112.

In some configurations, the use of the Curie temperature and/or inductive heating may provide some benefits over conventional ice prevention systems. In one example, the use of the Curie temperature of a structural component may reduce, or eliminate, the need to install temperature detection equipment, possibly reducing the integrity of the component while increasing its weight. In a similar manner, inductive heating may reduce or eliminate the need to install heating elements.

Figure 2:
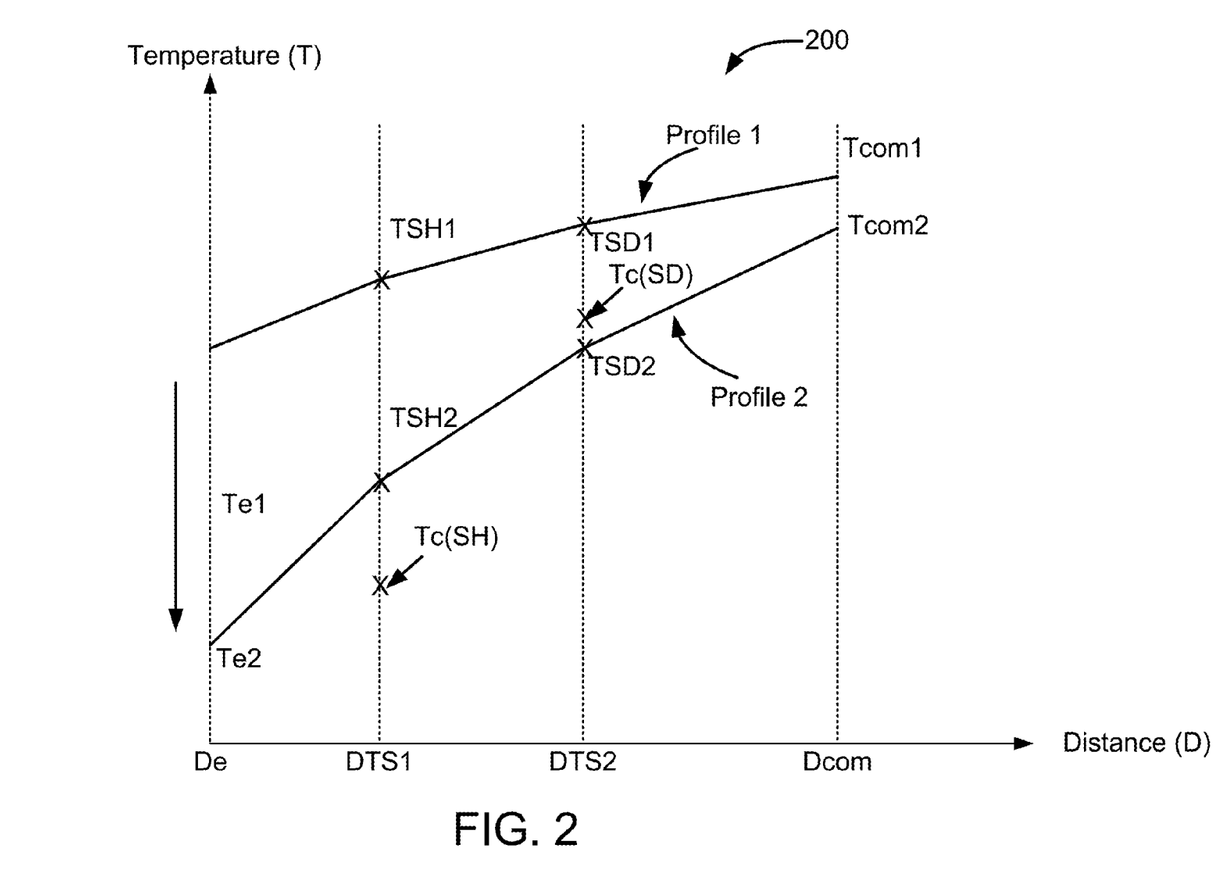
FIG. 2 is an example temperature profile of an IDD system according to at least one embodiment disclosed herein.

FIG. 2 is an example temperature profile 200 of the IDD system 100 according to at least one embodiment disclosed herein. The temperature profile 200 has axis T corresponding to temperature and D for distance. The temperature profile 200 illustrates a temperature profile using thin shell approximation, thus the temperature data is shown across the various layers as being a straight line, though it should be noted that the temperature profile 200 can be extended to include the quadratic dependence of temperature on the structural dimensions without losing generality. It should be understood that the temperature profile 200 is merely exemplary and is not an intent to limit the scope of the present disclosure to systems that fit the illustrated slopes of the data shown in the temperature profile 200. Distance De corresponds to the outer surface of the erosion shield 102, which is exposed to the environment. The temperature profile 200 is shown in an environment in which the outside air is less than the temperature at the composite layer.

Profile 1 is an initial temperature profile of the IDD system 100 at a temperature above any of Curie temperatures of the layers of the IDD system. Te1 is the temperature of the outer surface of the erosion shield 102. TSH1 is the temperature of the heating susceptor 104 at the interface of the erosion shield 102 and the heating susceptor 104. TSD1 is the temperature of the detecting susceptor 106 at the interface of the heating susceptor 104 and the detecting susceptor 106. Tcom1 is the temperature at of the composite structure 110 at the interface of the detecting susceptor 106 and the composite structure 110.

As illustrated in FIG. 2, the surface temperatures in Profile 1 of both the heating susceptor 104 and the detecting susceptor 106 are above their respective Curie temperatures, Tc(SH) and Tc(SD), respectively. At this temperature, the magnetic field properties of the heating susceptor 104 and the detecting susceptor 106 show a relatively higher temperature, i.e. a temperature above their respective Curie temperatures.

Profile 2 is a temperature profile that may result when the external temperature decreases. The reduced external temperature may reduce Te1 to Te2. Through the physical process of heat transfer, the reduction in temperature from Te1 to Te2 may cause a reduction in other temperatures across the IDD system 100. For example, TSH1 is reduced from TSH1 to TSH2, TSD1 is reduced to TSD2 and Tcom 1 is reduced to Tcom2. It should be understood that the Profile 1 and the Profile 2 are merely illustrative and are not intended to show accurate or specific heat transfer rates or heat transfer slopes across the various layers.

Due to the reduction of the temperature TSD1 to TSD2, a portion of the detecting susceptor 106 has a temperature below the Curie temperature, Tc(SD), of the detecting susceptor 106. Having a temperature below its Curie temperature, Tc(SD) may cause a change in the magnetic properties of the detecting susceptor 106. This change may be detected in various ways and used to determine if the temperature at Te2 is at or below a temperature favorable to, or indicating, ice formation. This may be determined using the heat transfer coefficients across the IDD system 100 as well as heat balance equations.

As illustrated by way of example in FIG. 2, and the assumption on the thin shell approximation, the temperature across the erosion shield may be expressed using Equation 1.1, which is indicative of the external temperature decreasing while an aircraft increases altitude:

$$T_E = T_{S1}(1 - \alpha_E h_E) \tag{1.1}$$

In equation 1.1, $h_E$ is the thickness of the erosion shield and $\alpha_E$ is the thermodynamic constant that is specific for the material the shield is built from. $\alpha_E$ is a function of the thermal conductivity and the specific heat capacity. Generally, $\alpha_E$ will define the slope between $T_E$ and $T_{S1}$, which is assumed to be linear due to the thin shell approximation.

The similar may hold for other suscepting layers:

$$T_{S1} = T_{S2}(1 - \alpha_{S1} h_{S1}) + \frac{q_{S1}}{c_{S1} \rho_{S1}} \tag{1.2}$$

$$T_{S2} = T_{COM}(1 - \alpha_{S2} h_{S2}) + \frac{q_{S2}}{c_{S2} \rho_{S2}} \tag{1.3}$$

Coefficients $\alpha_{E, S1, S2}$ of equations 1.2 and 1.3 can be defined from the numerical simulations or from the experiments. In some instances, if a more accurate model than the thin shell approximation is required, then the heat flow may be represented by equation 2:

$$\frac{\partial T}{\partial t} = \alpha^2 \left[ \frac{\partial^2 T}{\partial x^2} + \frac{\partial^2 T}{\partial y^2} + \frac{\partial^2 T}{\partial z^2} \right] + q^*(x, y, z) \tag{2}$$

where $q^*(x,y,z)$ is a term defining the ratio of internal to a layer heat generation to the thermal capacity $c_{S1, S2}$ and material's density' $\rho_{S1,S2}$ product. Therefore, equation (1) would have the terms, associated with the heat generation due to the induction heating as:

$$T_i = T_j(1 - \alpha_i h_i) + q^*_i; \ i = E; \ j = S1 \tag{3}$$

i=S1; j=S2 i=S2; j=COM

The system defined by equation 3 (without specifying the heat density of the sources $q_j$) may provide a description of the temperature distribution inside each layer of the IDD system 100. If the intensity of the heat generation sources is negligible, equation 1 may be used. In some configurations, though, equation 1 is valid until there is a good thermal insulator, such as the insulation 108, installed between the composite structure 110 and the detecting susceptor 106 (or the detecting susceptor 106 is a relatively good thermal insulator) or the composite structure 110 prevents the heat flow through it such that $-\partial T/\partial n = 0$, where n is the outward normal. In this case, equation 3 may be required.

The temperature the composite structure 110 is exposed to during some aircraft operation can be practically limited to the service temperature of the composite structure 110, or other temperatures as needed or desired. This may be related to the temperature of the detecting susceptor 106 and its dimensions and materials properties such that if TSD is approaching this limit, all the $q_i$ (sources of heat inside the heating susceptor 104, the detecting susceptor 106 and the erosion shield 102) may be shut off. Thus, in that configuration, equation 1 can be arranged into equation 4 as follows:

$$T_E = \{T_{com}(1 - \alpha_{S2} h_{S2}) + q^*_{S2}\}\{(1 - \alpha_{S1} h_{S1}) - g^*_{S1}\}(1 - \alpha_E h_E) \tag{4}$$

The coefficients α in the steady state are dependent only on the thickness h and specific heat capacity $C_p$. However, if the thickness h is not a variable, the α can be found from the heat capacity measurements experiment.

Equation (4) can therefore be used to define the ratio between the $T_{COM}$ $T_{s1}$, $T_{s2}$, and $T_E$. By analogy, solving the system of equations (3), the temperature at any point at any point of interest at the boundaries between the erosion shield 102, the heating susceptor 104, the detecting susceptor 106 and the composite structure 110 may be determined by knowing the temperature at one of the layers and the rates of heat generated internally inside the heating susceptor 104 and the detecting susceptor 106.

The role of heat generation may be useful in some automated control applications. As described above, knowing physical parameters and the temperature at one of the interfaces may help determine temperatures at other layers if heat transfer coefficients (q's) are zeros (zero out the q's in (4) and $T_{COM}$ or $T_E$ may be calculated).

The heat generated in the heating susceptor 104 by eddy currents may also be analyzed. The circling nature of eddy currents may result in generating both active and reactive losses. In magnetic materials, hysteresis losses may also contribute to the temperature rise in addition to the active losses. The reactive losses are proportional to the equivalent inductance $L_{eq}$ and some averaging of the equivalent current $I_{eq}$ as $L_{eq} I_{eq}^2 / 2$. Inductive losses do not contribute to the heat generated inside the heating susceptor 104 in contrary to the active losses.

The active losses are proportional to the same current, $I_{eq}$ and equivalent resistance $R_{eq}$ as $R_{eq} I_{eq}^2$. Both sources of losses may be identified because they are contributions to the equivalent impedance $Z_{eq}$ experienced by the circuitry (as per FIG. 1), and therefore, by a power supply connected to the coil. In a magnetic material, heat generation, q, is also a function of the hysteresis losses, i.e. proportional to the frequency f and magnetic field $B_m$, as shown in equation 5.

$$\text{therefore the active losses: } W_{act} \cong R_{eq} I_{eq}^2 + K_h f B_m^{1.6} \tag{5}$$

$$\text{and reactive: } W_{re} = \frac{L_{eq} I_{eq}^2}{2}$$

In equation 5, $K_h$ is a hysteresis constant specific for each material and $B_m$ is a solution of the set of Maxwell's equations with specified boundary and initial conditions that are unique for any unique geometry, materials and position of the coil(s). Using equation 5, the equivalent impedance, and therefore heating capacity of the IDD system 100, may be found using equation 6.

$$Z_{eq} = R_{eq} + i*2*Pi*f*L_{eq} \tag{6}$$

The IDD system 100 may be operated in various ways. For example, a general methodology for detecting and reducing ice conditions may be as follows. In the present example, the heating susceptor 104, the detecting susceptor 106, the coil 112 and a power supply (not shown) form a resonant circuit. The resonance frequency increases approximately as the square root of the magnetic permeability of a particular susceptor layer.

Induction power supplies may be designed with internal circuitry and control algorithms to find and operate at the resonance frequency. If a temperature of a particular susceptor reaches its Curie temperature approaching from the lower range, the magnetic permeability of a material drops by the orders of magnitude, therefore shifting the resonant frequency. Also, if temperature drops and reaches the Curie temperature from a higher range, the magnetic permeability of a material rises by the orders of magnitude therefore also shifting the resonant frequency of the power supply's output.

Another effect that may be monitored is the sensitivity of the magnetic permeability of some ferromagnetics in weak magnetic fields while temperature changes. Permeability changes as the temperature increases or decreases. In this case in addition to measuring frequency, the changes of the total impedance sensed by a power supply may be measured. The method to control the IDD system 100 heating aspect in some configurations may be based on detecting of changes in the resonant frequencies or impedance and differentiating corresponding processes specific for two suscepting layers as the example below shows.

Temperatures corresponding to the ice forming conditions at the surface of the erosion shield 102 can alter the temperatures at the interfaces of the heating susceptor 104, the detecting susceptor 106 or the composite structure 110. The alteration of temperatures can be detected by comparing the power supply output frequency (or impedance) with a predetermined frequency (impedance), which is a function of the susceptor alloy and the design of the coil 112. The metal or metal alloy forming the detecting susceptor 106 can be made such that Curie temperature of the detecting susceptor 106 would correspond to the temperature profile shown on the FIG. 2 when the temperature at the surface of the erosion shield $T_E$ reaches the ice forming conditions, i.e. in the vicinity of 32 F, without specifying its accuracy.

If the detecting susceptor 106 is used to automatically turn an induction heating system ON, then in some configurations it may be useful to monitor changes in the resonant frequency (and/or impedance) in a power supply due to the changes of the magnetic permeability of the detecting susceptor 106. If the temperature decreases (during takeoff or landing after several de- or anti-icing functions have already been exercised) and the Curie temperature of the detecting susceptor 106 is reached, it may be beneficial in some configurations to monitor a frequency (impedance) shift due to the significant rise of the magnetic permeability of the detecting susceptor 106.

Monitoring of the resonant frequency and impedance shifting may be implemented using either continuous run of a power supply or a pulsing scheme when the pulses have duration and the interval between them sufficient to determine that ice formation favorable conditions are present. For example a pulse with duration longer than the transient process of the circuit is applied every 5-10 seconds may be sufficient to indicate ice formation conditions.

If changes in the resonant frequency (impedance) detected by a power supply are due to changes in magnetic permeability of the detecting susceptor 106, a power supply (or a separate power supply) can provide an output with the resonant frequency predetermined for the heating susceptor 104. The Curie temperature of the heating susceptor 104 to turn the system OFF can be selected taking into account the upper limit of the service temperature tolerable by the various layers of the IDD system 100, including the composite structure 110.

For example, the Curie temperature of the heating susceptor 104 can selected to be 150 F-180 F, at which the structural strength of a composite can compromised. The exact Curie temperature of the heating susceptor 104 can be defined by analyzing FIG. 1 and the equations set forth above. Alternatively, the Curie temperature of the heating susceptor 104 can be high enough to support thermal capacitive energy storage in the layers, increasing cooling time, and therefore, reducing the duty cycle while increasing efficiency. The power supply can be turned OFF or can stay ON after the heating susceptor 104 heated up to its Curie temperature, depending on the control algorithm.

Another example manner to operate the IDD system 100 of FIG. 1 may be used if a power supply is regulated manually, configured to operate using the resonant frequency, or during a calibration procedure. The present method is based on monitoring changes in impedance $Z_{eq}$ by a power supply(s) when the temperature in the heating susceptor 104 and/or the detecting susceptor 106 reaches its respective Curie temperature. The selection of Curie temperatures for the heating susceptor 104 and the detecting susceptor 106 may be similar to the process described above. Changes in a magnetic permeability of a material can also result in the change of the impedance $Z_{eq}$ and in its components as per equation 6. If the impedance $Z_{eq}$ changes, the phase shift between the current and the voltage and their magnitudes also changes. If the detecting susceptor 106 is used to turn the system ON, a change in the phase between the current and voltage, and in their magnitude, occurs due to a rise of magnetic permeability. If the heating susceptor 104 is used to turn the system OFF, a change in the phase shift between the current and voltage occurs due to a reduction of magnetic permeability. This present method, therefore, is based on monitoring the voltage, current and a phase shift between the voltage and current.

As described above, some configurations of a two-susceptor design can use one susceptor layer to measure temperature and the other to induce heat. This leads to the general requirement that the Curie temperature of the detecting susceptor 106 shall generally be lower than the Curie temperature of the heating susceptor until their functions interchange which may result in the decreasing of the overall system efficiency. To achieve sufficient temperature sensitivity, the temperature dependent effective permeability of the combined layers may preferably need to be sensitive to temperature in the range from 32 F-42 F. The heating layer may have a large permeability that is relatively insensitive to temperature at temperatures in this range. The heating layer may be relatively thicker than the sensing layer, resulting in reduced sensitivity of a sensing coil to the temperature dependence of the sensing layer.

An example method for compensating for this effect is to select a sensing layer alloy that is "magnetically soft," i.e. has a large permeability in weak magnetic fields. For example, a sensing alloy of approximately 29% nickel/61% iron can have (depending on manufacturing details) a relative permeability of 400 in a (relatively weak) 1 Oe (1 Oersted) magnetic field at 42 F and a relative permeability of 200 at 32 F. Further, a heating alloy that is approximately 30% nickel/70% iron can have (again depending on manufacturing details) a permeability that has a small temperature dependence in the 42-32 F range but with a permeability that is strongly dependent on field strength e.g. permeability of 400-40 Oe but 50 at 1 Oe. The result is that in a weak magnetic (sensing) field, the highly temperature dependent alloy dominates (relative permeability of 200 vs. 50 for the heating layer) and the combined effect of the two layers is an effective permeability that is sensitive to temperature.

Another example method may be to select different magnetic anisotropies (permeability is dependent on the orientation of the magnetic field relative to the layer) for the detecting susceptor and the heating susceptor layers. For example if the heating layer anisotropy is parallel to the leading edge and the sensing layer is perpendicular to the leading edge, then a sensing coil that is aligned perpendicular to the edge will only be sensitive to the properties of the sensing layer. In this case the heating layer can be induced by a coil parallel to the edge.

Anisotropy can be created by several common manufacturing processes such as roll milling and magnetic field annealing. Another approach to creating anisotropy is by shape. Magnetic materials that have a high aspect ratio (one dimension much larger than the others) such as wires have very high anisotropy. For example, if the sensing layer is in the form of wires aligned parallel to the edge then a coil aligned parallel to the edge will be sensitive to the temperature dependence of this alloy.

Figure 3:
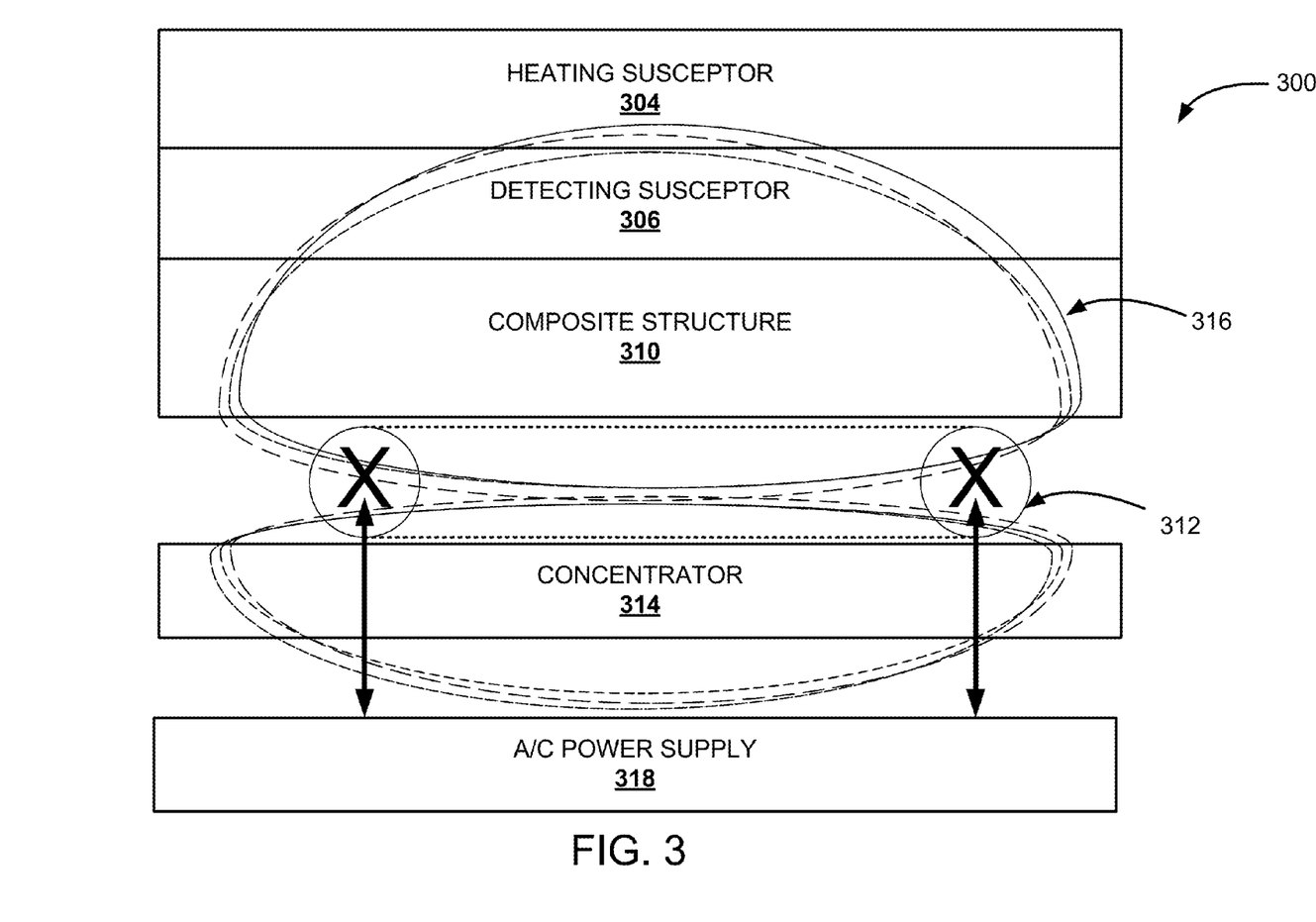
FIG. 3 is a side view of an alternate IDD system according to at least one embodiment disclosed herein.

FIG. 3 is a side view of an alternate IDD system 300 according to at least one embodiment disclosed herein. In this case the heating susceptor 304 may also act as an erosion shield. The IDD system 300 of FIG. 3 is a multi-layer system that includes a heating susceptor 304 and a detecting susceptor 306. The IDD system of FIG. 3 also includes a composite structure 110, a coil 312 and a concentrator 314.

In some configurations, the heating susceptor 304 may be configured as a detector to sense air temperature at a location of an aircraft to which the IDD system 300 is installed. The heating susceptor 304 may be configured to be susceptible and sensitive to a magnetic flux 316 created by the coil 312 when powered by a power supply 318. As described above, the magnetic flux 316 may induce eddy currents within the heating susceptor 304, creating heat. The power supply 318 may be energized when a portion of the detecting susceptor 306 reaches the Curie temperature of the detecting susceptor 306. In one example of a use, a low-powered "ping," or signal, can be transmitted at various time intervals from the coil 312 to determine a temperature. If a certain temperature is reached, using the detection of a transition of a temperature of a component below a Curie temperature, the coil 312 can be powered to a certain level to increase a temperature of a component above the Curie temperature.

The magnetic flux 316 created by the coil 312 when energized by the power supply 318 may be modified, focused or concentrated using the concentrator 314. The concentrator 314 may be constructed of various materials designed to interact and modify magnetic fields. In some configurations, this may provide various benefits. For example, by focusing the magnetic flux 316 towards the heating susceptor 304, an equivalent amount of heat may be generated in the heating susceptor 304 using a lower amount of power than a system without the concentrator 314, therefore increasing the overall system efficiency. Another benefit may be the reduction of the magnetic flux 316 to areas surrounding the IDD system 300. This may reduce unintended or unwanted effects of the magnetic flux 316 on systems or objects not associated with the IDD system 300.

Figure 4:
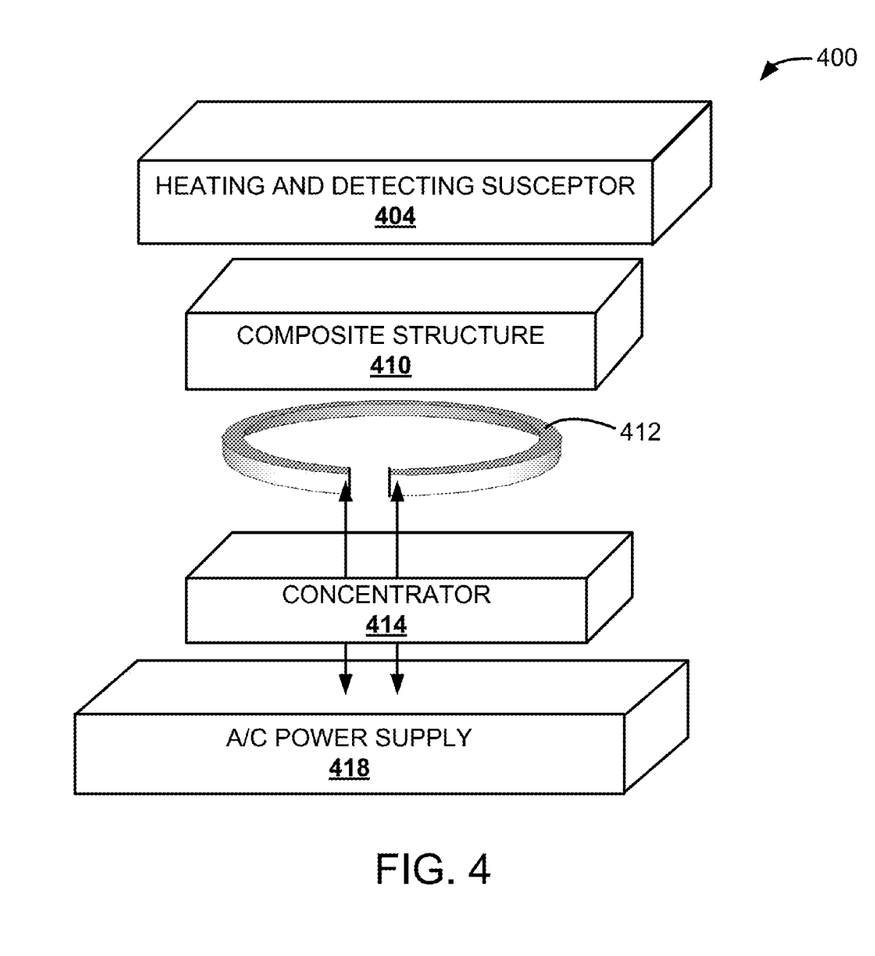
FIG. 4 is an exploded, perspective view of an IDD system according to at least one embodiment disclosed herein.

FIG. 4 is an exploded, perspective view of an IDD system 400 according to at least one embodiment disclosed herein. The IDD system 400 of FIG. 4 is a multi-layer system that includes a heating and detecting susceptor 404, a composite structure 410, a coil 412, a concentrator 414, and an alternating current power supply 418. As discussed above, in various configurations an IDD system, the detecting/heating functionality of the one or more susceptors may be combined into a single susceptor.

An example of combining two or more layers is illustrated in FIG. 4 as the heating and detecting susceptor 404, which is a combined heating and detecting susceptor. The metal or metallic alloy comprising the heating and detecting susceptor 404 may be selected based on its combined function. It should be appreciated that structure of the heating and detecting susceptor 404 may be homogeneous throughout the heating and detecting susceptor 404 or may vary. For example, a portion of the heating and detecting susceptor 404 may be one alloy or metal designed to perform the detecting function, while another portion of the heating and detecting susceptor 404 may be designed to perform the heating function.

Figure 5:
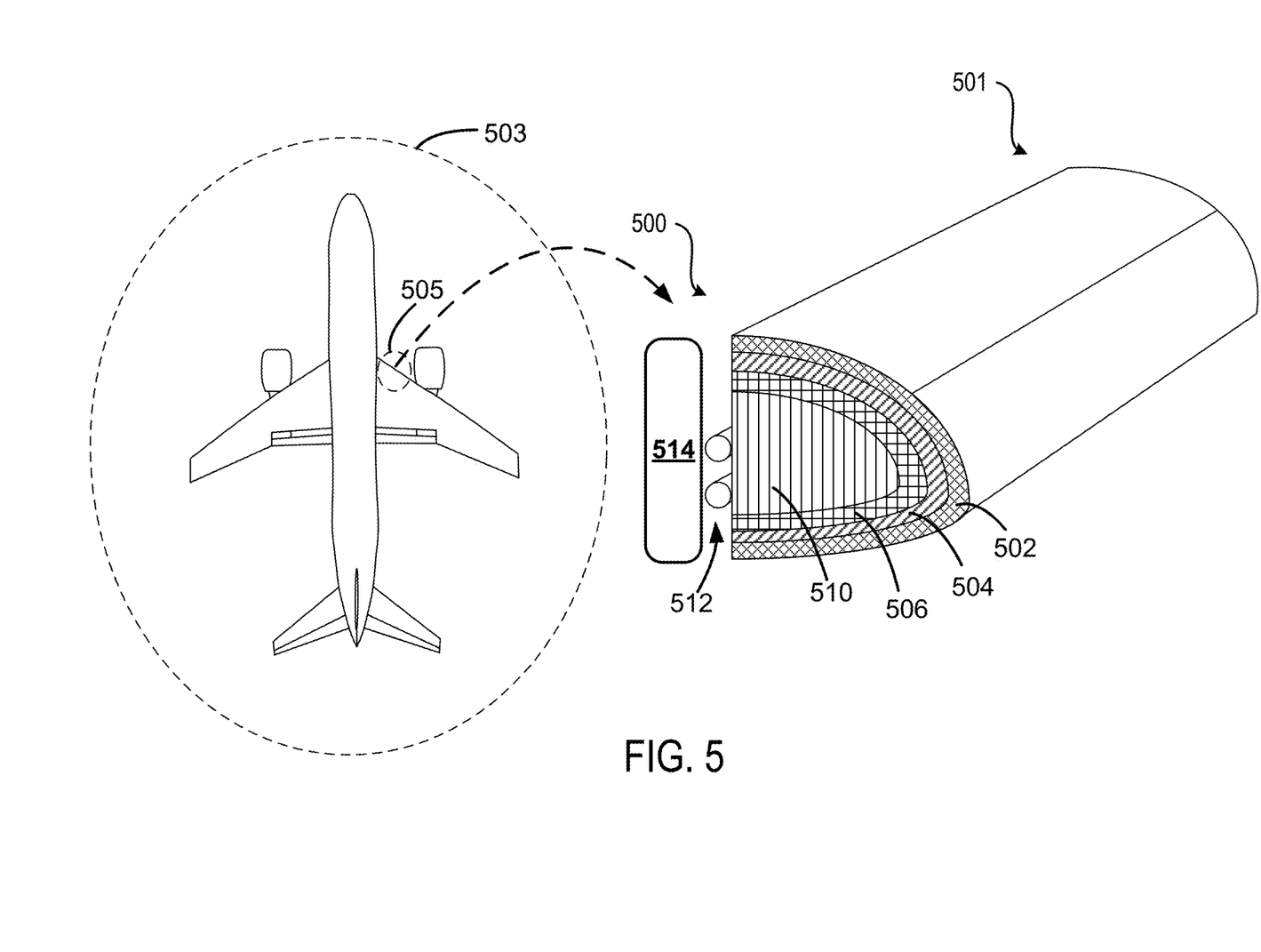
FIG. 5 is a partial, cross sectional view of an IDD system installed on a wing of an aircraft according to at least one embodiment disclosed herein.

FIG. 5 is a partial, cross sectional view of an IDD system 500 installed on a wing 501 of an aircraft according to at least one embodiment disclosed herein. One or more of the IDD systems 500 may be installed on various locations on an aircraft, such as the location 505 of the aircraft illustrated in FIG. 5 inset 503. The location 505 may be a leading edge of the wing 501 that is susceptible to ice formation. Other locations can include, but are not limited to, various control surfaces, detection and measurement equipment (such as airspeed probes), and surfaces proximate to an engine intake.

The IDD system 500 of FIG. 5 is a multi-layer system that includes an erosion shield 502, a heating susceptor 504, a detecting susceptor 506, a composite structure 510, a coil 512, and a concentrator 514. The erosion shield 502 may be configured to protect one or more components of the IDD system 500 from degradation effects caused by the environment. The heating susceptor 504 may be configured to be responsive to a magnetic flux, causing the temperature of the heating susceptor 504 to increase.

The detecting susceptor 506 may be configured to have a Curie temperature that, when reached, indicates ice formation or conditions favorable for ice formation. The composite structure 510 may be operative to support the various components of the IDD system 500. The coil 512 may be configured to provide a magnetic flux when energized. The position of the coil 512 can vary and can be closer to the detecting susceptor 506 if the internal portion of the composite structure 510 is removed or can be embedded into the composite structure. And, the concentrator 514 may be configured to modify the magnetic flux to increase the efficiency of the IDD system 500.

Figure 6:
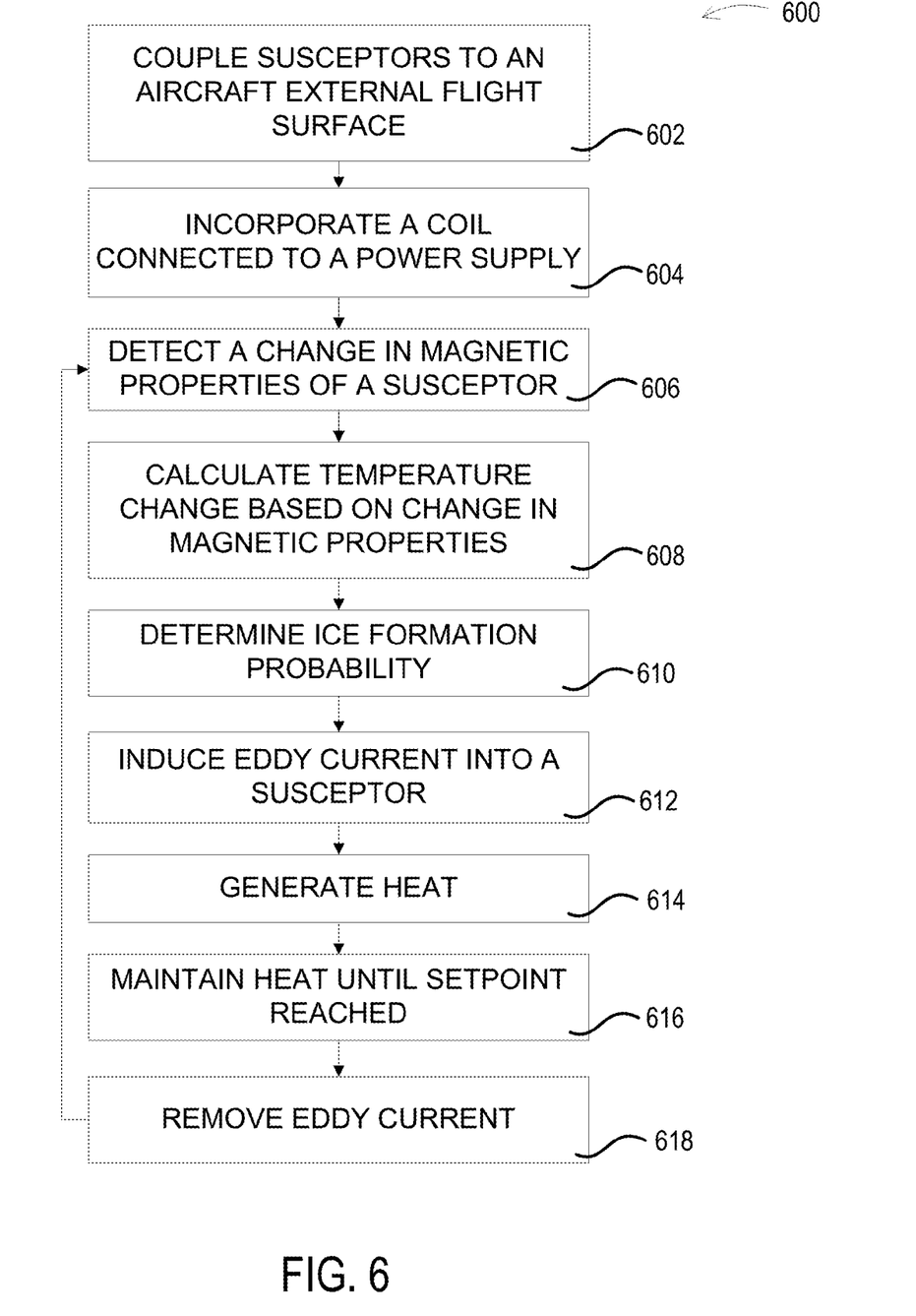
FIG. 6 illustrates one configuration of a routine for operating an IDD system according to at least one embodiment disclosed herein.

FIG. 6 illustrates one configuration of a routine 600 for operating an IDD system according to at least one embodiment disclosed herein. Unless otherwise indicated, more or fewer operations may be performed than shown in the figures and described herein. Additionally, unless otherwise indicated, these operations may also be performed in a different order than those described herein.

The routine 600 commences at operation 602, where the heating susceptor 104 and/or the detecting susceptor 106 are coupled to an aircraft external flight surface. In some examples, the erosion shield 102 may be installed as a barrier between the heating susceptor 104 and/or the detecting susceptor 106. As described above, the external flight surface can vary from locations on an aircraft wing, control surfaces, engine, and detection equipment. Also as described above, the heating susceptor 104 and/or the detecting susceptor 106 may be formed from one or more layers, each layer performing the detection and/or the heating function described above. For example, in one configuration, a single susceptor layer, e.g. the heating susceptor 104, may be used for both detection and heating functions. In another example, one susceptor may be used to perform the detection function, e.g. the detecting susceptor 106, while another susceptor may be used to perform the heating function, e.g. the heating susceptor 104. It should be understood that these and other combinations are considered to be within the scope of the present disclosure.

The routine 600 continues to operation 604, where the coil 112 is incorporated into the IDD system 100 and connected to a power supply. In some configurations, the coil 112 is used to create eddy currents in the heating susceptor 104 and/or the detecting susceptor 106, causing the temperature of the affected susceptor layers to increase. In another configuration, the coil 112 may be configured to act as a detector to detect changes in magnetic properties of the heating susceptor 104 and/or the detecting susceptor 106. For example, a temperature decrease may have caused a susceptor layer to reach its Curie temperature, altering its magnetic properties. The change in magnetic properties may be detected using the magnetic flux generated by the coil 112.

The routine 600 continues to operation 606, where a change in the magnetic properties of the heating susceptor 104 and/or the detecting susceptor 106 is detected. As described above, the change may be due to a decrease in air temperature proximate to the IDD system 100, causing the temperature of the particular susceptor to decrease below its Curie temperature. The change in magnetic properties may be detected using various technologies. For example, the change in magnetic properties may be detected by a change of the resonance frequency or impedance detected by circuitry feeding IDD system 100.

The routine 600 continues to operation 608, where a temperature change is calculated based on the detected change in magnetic properties. The metal or metallic alloy may be selected to have a particular change in magnetic properties at a certain temperature or temperature range.

The routine 600 continues to operation 610, where a determination is made as to the probability of ice formation. As discussed above, various configurations of the present disclosure may be used to determine whether or not ice has formed on the outer surface of the IDD system 100, or, whether the temperature calculated is conducive to the formation of ice, or both.

The routine 600 continues to operation 612, where eddy currents are induced into the heating susceptor 104 if the probability of ice formation meets a certain criteria. The eddy currents may be induced using the coil 112 of the IDD system 100. The routine 600 continues to operation 614, where heat is generated by the induction of eddy currents into the heating susceptor 104.

The routine 600 continues to operation 616, where the induction and heat are maintained until a set point is reached. For example, a set point may be a detected change in magnetic properties of the heating susceptor 104 back to a condition indicating an increase in temperature of the one or more susceptors above their respective Curie temperatures.

The routine 600 continues to operation 618, where the eddy current is removed. The routine 600 may end or may continue as described above by returning to operation 606, where a change in magnetic properties of the heating susceptor 104 and/or the detecting susceptor 106 is detected. In some configurations of the routine 600, additional operations may include coupling the erosion shield 102 to an exterior of the heating susceptor 104 and/or the detecting susceptor 106, overlapping the erosion shield 102 to the exterior of the heating susceptor 104 and/or the detecting susceptor 106, coupling the heating susceptor 104 and/or the detecting susceptor 106 to an exterior of a composite structure of an aircraft, positioning the coil 112 on an opposite side of the composite structure 110, and positioning the concentrator 114 proximate to the coil 112. In some configurations, the concentrator 114 may comprise various suitable materials such as, but not limited to, a non-electrically conducting ferromagnet. In some examples, the ferromagnet may include a ferrite material such as MnZn or NiZn. In other configurations, the routine 600 may also include operations for coupling the insulation 108 between the heating susceptor 104 and/or the detecting susceptor 106 and the composite structure 110.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. An ice detection and deicing ("IDD") system, comprising:
    a heating susceptor operative to increase temperature in response to an eddy current;
    a detecting susceptor having a Curie temperature configured to change its magnetic properties at a desired temperature associated with ice formation;
    a coil operative to induce eddy currents in the heating susceptor in response to a change in the magnetic properties of the detecting susceptor as the temperature of the susceptor changes from above the Curie temperature to below the Curie temperature; and
    a concentrator operative to interact and modify a magnetic flux created by the coil to focus the magnetic flux towards the heating susceptor.

2. The IDD system of claim 1, further comprising an alternating current power supply operative to energize the coil to provide for a magnetic flux to induce eddy currents in the heating susceptor.

3. The IDD system of claim 1, wherein the heating susceptor and the detecting susceptor comprise a single layer.

4. The IDD system of claim 1, wherein the Curie temperature is selected based on conditions conducive to ice formation.

5. The IDD system of claim 1, wherein the concentrator is further operative to partially insulate one or more locations proximate to the IDD system from the magnetic flux.

6. The IDD system of claim 1, further comprising an insulating layer installed between the detecting susceptor and a composite structure.

7. The IDD system of claim 6, wherein the insulating layer comprises thermal insulation.

8. The IDD system of claim 1, further comprising an erosion shield operative to reduce erosion of various components of the IDD system.

9. The IDD system of claim 8, wherein the erosion shield comprises aluminum, steel, titanium, or other corrosion resistant ferrite metals or metallic alloys.

10. A method for operating an ice detection and deicing system, the method comprising:
    coupling one or more susceptors to an exterior of an aircraft external flight surface;
    positioning a coil on an opposite side of the composite structure;
    positioning a concentrator proximate to the coil;

operating an aircraft having the one or more susceptors on the aircraft external flight surface;

detecting a change in a magnetic property of the one or more susceptors caused by a reduction in temperature of the one or more susceptors below a Curie temperature of the one or more susceptors;

calculating a temperature change based on the change in the magnetic property;

determining a probability of ice formation on the aircraft external flight surface;

inducing eddy currents into the one or more susceptors to generate heat within the one or more susceptors;

maintaining the induction of eddy currents until a set point is reached; and removing the induced eddy currents once the set point is reached.

11. The method of claim 10, wherein the concentrator comprises a ferrite material.

12. The method of claim 10, further comprising coupling a thermal insulation layer between the one or more susceptors and the composite structure.

13. The method of claim 10, further comprising operating an aircraft having one or more susceptors to an aircraft external flight surface and incorporating a coil connected to a power supply, the coil and power supply operative to create a magnetic flux to detect a change in a magnetic property of the one or more susceptors and to increase the temperature of the one or more susceptors by inducing eddy currents in the one or more susceptors.

14. The method of claim 13, further comprising operating an aircraft coupling an erosion shield to an exterior of the one or more susceptors.

15. An aircraft wing leading edge, comprising:

an erosion shield operative to reduce erosion;

a heating susceptor operative to be responsive to eddy current formation, causing the temperature of the heating susceptor to increase;

a detecting susceptor having a Curie temperature used to indicate a change in temperature of the detecting susceptor;

a composite structure operative to support one or more components of the ice detection and deicing systems;

an insulating layer installed between the detecting susceptor and the composite structure;

a coil operative to induce eddy currents in the heating susceptor;

an alternating current power supply operative to energize the coil to provide for a magnetic flux to induce eddy currents in the heating susceptor to increase the temperature of the heating susceptor; and a concentrator operative to interact and modify a magnetic flux created by the coil to focus the magnetic flux towards the heating susceptor.

16. The aircraft wing leading edge of claim 15, wherein the erosion shield comprises aluminum, steel, titanium, or other corrosion resistant ferrite metals or metallic alloys.

17. The aircraft wing leading edge of claim 15, wherein the heating susceptor and the detecting susceptor comprise a single layer.

18. The aircraft wing leading edge of claim 15, wherein the concentrator is further operative to partially insulate one or more locations proximate to the coil from the magnetic flux.

* * * * *